United States Patent [19]
Lowe

[11] Patent Number: 6,125,396
[45] Date of Patent: *Sep. 26, 2000

[54] METHOD AND APPARATUS FOR IMPLEMENTING BANDWIDTH ALLOCATION WITH A RESERVE FEATURE

[75] Inventor: David Lowe, Foster City, Calif.

[73] Assignee: Oracle Corporation, Redwood Shores, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/824,619

[22] Filed: Mar. 27, 1997

[51] Int. Cl.$^7$ ........................................ G06F 13/38
[52] U.S. Cl. .................. 709/234; 709/231; 709/232; 709/233; 709/234; 710/21; 710/25; 710/27; 710/42; 710/43; 707/2; 370/468
[58] Field of Search ...................... 709/232, 233, 709/234; 710/1, 5, 7, 22, 23, 28, 36; 707/2; 370/468

[56] References Cited

U.S. PATENT DOCUMENTS 5,566,175 10/1996 Davis ...................................... 709/234
5,630,067 5/1997 Kindell et al. ............................. 707/2
5,713,013 1/1998 Black .................................. 395/200.62
5,802,310 9/1998 Rajaraman ............................... 709/234

Primary Examiner—Glenton B. Burgess
Assistant Examiner—Hieu C. Le
Attorney, Agent, or Firm—Hickman Palermo Truong & Becker, LLP; Marcel K. Bingham

[57] ABSTRACT

A method for accessing a shared resource is provided. An assigned usage rate is received from a resource coordinator and a desired usage rate is determined. When it is determined that the desired usage rate is higher than the assigned usage rate, a shared resource may be accessed at an enhanced usage rate if a usage reserve has been accumulated. When a shared resource is accessed at an enhanced usage rate, the usage reserve is decremented by an amount based on a difference between the enhanced usage rate and the assigned rate. When there is no usage reserve accumulated, access to the shared resource is limited to the assigned usage rate. When the desired usage rate is not higher than the assigned usage rate, a shared resource is accessed at the desired usage rate. When the desired usage rate is less then the assigned usage rate, the usage reserve is accumulated up to a reserve maximum. The reserve maximum may be based on configuration data.

22 Claims, 4 Drawing Sheets

METHOD AND APPARATUS FOR IMPLEMENTING BANDWIDTH ALLOCATION WITH A RESERVE FEATURE

RELATED APPLICATION

The present application is related to: U.S. patent application Ser. No. 08/646,685, entitled "DYNAMIC INPUT/OUTPUT BANDWIDTH ALLOCATION IN A REAL TIME PROCESSING SYSTEM", filed by Sue Lee and William Bailey on May 6, 1996, the contents of which are incorporated herein by reference.

FIELD OF THE INVENTION

The present invention relates to allocating bandwidth in a computer system, and more particularly, to allocating bandwidth between a server and the clients of the server in a distributed computing environment.

BACKGROUND OF THE INVENTION

A client is any entity which receives data supplied by a server. Clients of a data server may include, for example, a process on the same node as the data server, a process on a different node than the data server, or a thread within a process. In a multi-process client/server computer system, a data server usually supplies data to multiple clients. The maximum rate at which a data server can supply data is known as the bandwidth of the server. The bandwidth of a server is divided among the clients of the data server.

Based on the functions performed by clients, clients of data servers can be classified as either real-time or non-real-time. Real time clients require data at set times and at a relatively constant rate. Data that arrives late typically is useless to real-time clients and can cause problems. For example, data for movie frames from a video server that arrives too late to be shown cannot be used and causes a visible momentary interruption of the movie. Timing is not so critical to non-real-time clients. Non-real-time clients do not require data at set times and may use data at varying rates.

Various approaches can be employed to allocate the bandwidth of a data server among clients of the data server. Operating systems typically use a preemptive approach to allocate bandwidth to clients. The preemptive approach emphasizes maximizing overall system throughput rather than providing a constant bandwidth to individual clients. Serving data requested by one client can be accomplished more efficiently by preempting the requests for data by other clients. The preemption can occur regardless of whether the preempted requests originated from real-time clients. Thus, real-time clients can incur undesirable interruptions and inconsistency in the rate at which they are allowed to access data in preemptive systems.

Another approach, the bandwidth allocation approach, avoids these undesirable interruptions. Under the bandwidth allocation approach, a portion of the total bandwidth of the server is assigned to each client.

While the bandwidth allocation approach assures availability of bandwidth for real-time clients, the approach wastes available bandwidth. Typically, clients, especially non-real-time clients, do not fully use the portion of the bandwidth assigned to them. Furthermore, the portion assigned to one client remains unavailable to other clients even when the one client is not fully using its portion of the bandwidth.

To illustrate these drawbacks, assume that ten real-time clients and five non-real-time clients each require 2 mb/sec of data from a video server that can supply 30 mb/sec of bandwidth. The aggregate rate assigned to all of the clients is 30 mb/sec. When 3 non-real-time clients and 1 real-time client do not use their assigned portion for a period of time, an 8 mb/sec portion of the bandwidth is left unused. When, during the same period of time, one non-real-time client could temporarily use 15 mb/sec, the non-real-time client's actual use is limited to 2 mb/sec despite the presence of the unused portion of the bandwidth. The unused portion of bandwidth is wasted because the non-real-time client can not exceed its assigned portion.

Based on the foregoing it is clearly desirable to provide a method of allocating bandwidth which allows resources unused by one client to be used by another client when a demand exists for those resources. It is also clearly desirable to provide a method of allocating bandwidth that ensures a constant bandwidth to real-time clients while meeting the varying bandwidth needs of non-real-time clients.

SUMMARY OF THE INVENTION

A method for accessing a shared resource is disclosed. According to one aspect of the invention, an assigned usage rate is received from a resource coordinator and a desired usage rate is determined. When it is determined that the desired usage rate is higher than the assigned usage rate, a shared resource may be accessed at an enhanced usage rate if a usage reserve has been accumulated.

According to another aspect of the invention, when a shared resource is accessed at an enhanced usage rate, the usage reserve is decremented by an amount based on a difference between the enhanced usage rate and the assigned rate. When there is no usage reserve accumulated, access to the shared resource is limited to the assigned usage rate.

According to another aspect of the invention, when the desired usage rate is not higher than the assigned usage rate, a shared resource is accessed at the desired usage rate. When the desired usage rate is less then the assigned usage rate, the usage reserve is accumulated up to a reserve maximum. The reserve maximum may be based on configuration data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for allocating bandwidth is described. In the following description, for the purposes of explanation, numerous specific details are set forth in order to provide a thorough understanding of the present invention. It will be apparent, however, to a person of ordinary skill in the art that the present invention may be practiced without these specific details. In other instances, well-known structures and devices are shown in block diagram form in order to avoid unnecessarily obscuring the present invention.

Hardware Overview

Figure 1:
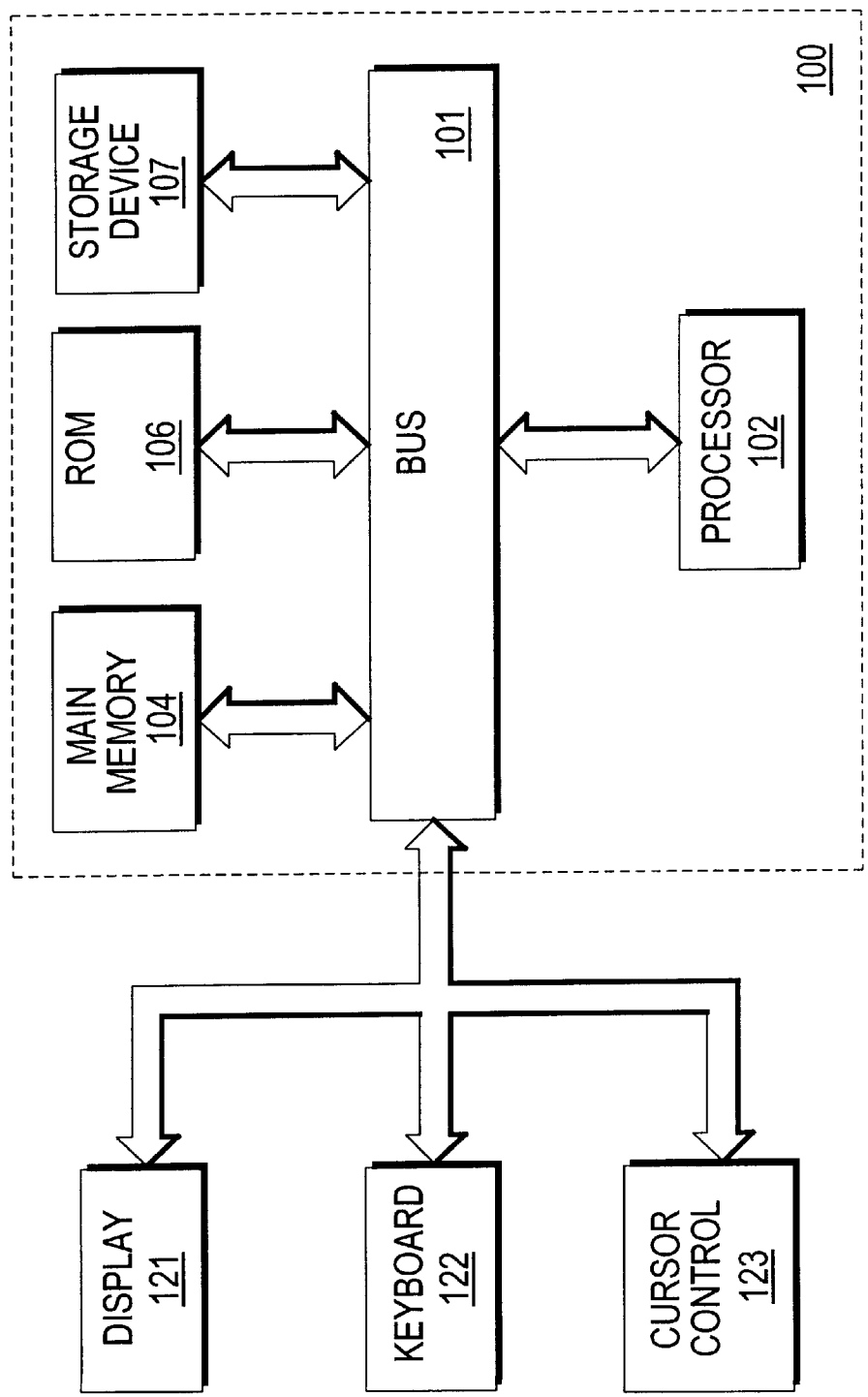
FIG. 1 is a block diagram of a computer system upon which an embodiment of the invention can be implemented.

FIG. 1 illustrates a block diagram of a computer system 100 upon which an embodiment of the present invention may be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also includes a read only memory (ROM) and/or other static storage device 106 coupled to bus 101 for storing static information and instructions for processor 102. A data storage device 107, such as a magnetic disk or optical disk, is coupled to bus 101 for storing information and instructions.

Computer system 100 may also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

The present invention is related to the use of computer system 100 to allocate bandwidth. According to one embodiment, the steps of allocating bandwidth are performed by computer system 100 in response to processor 102 executing sequences of instructions contained in memory 104. Such instructions may be read into memory 104 from another computer-readable medium, such as data storage device. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

The Leaky Bucket Model

Figure 2:
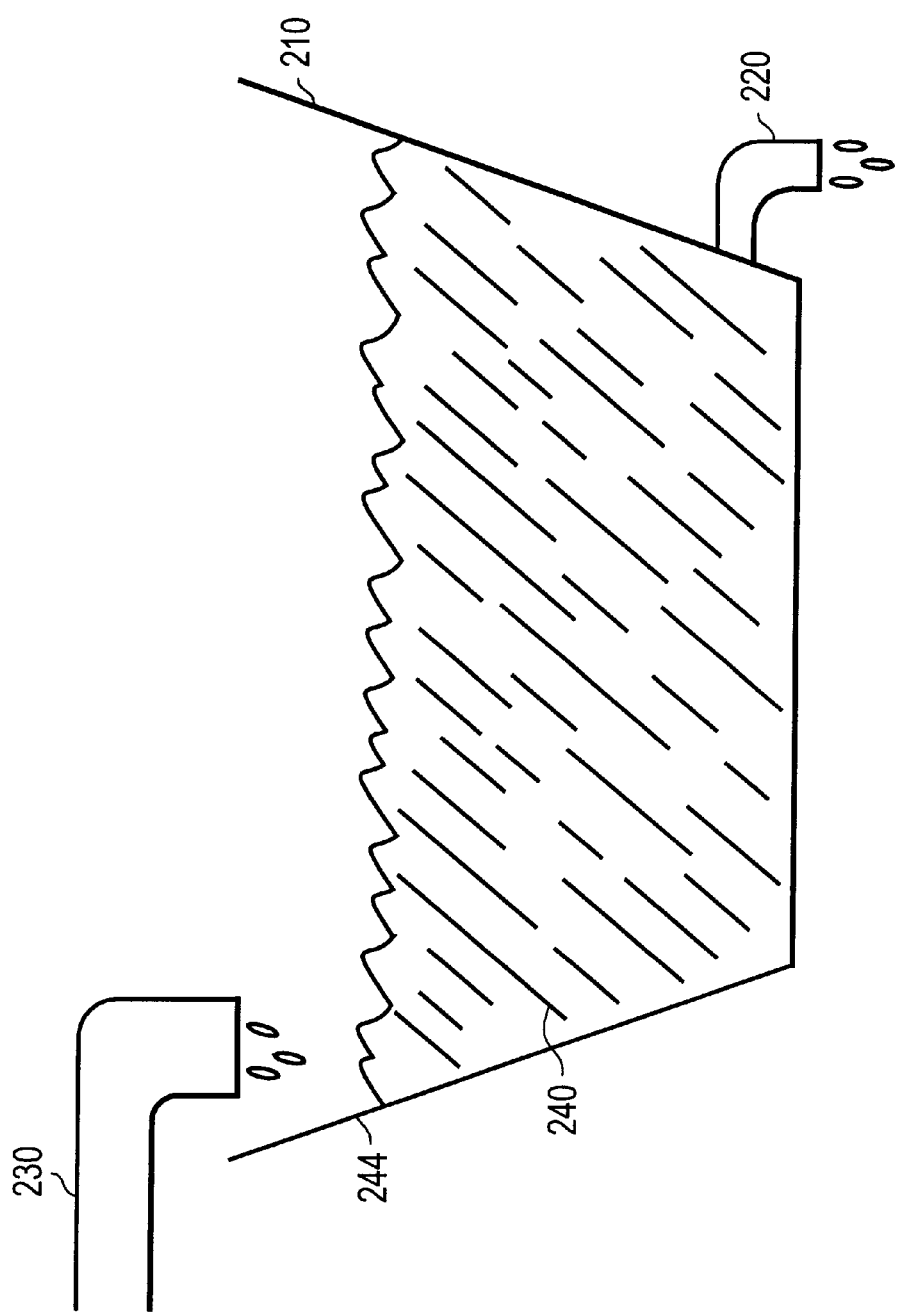
FIG. 2 is an illustration depicting a leaky bucket model demonstrating the operation of an embodiment of the invention.

The leaky bucket model depicted in FIG. 2 demonstrates the basic operation of one embodiment of the invention. Bucket 210 contains water 240. Currently, the water in the bucket is up to water line 244. Water 240 represents a reserve. The water dripping out of faucet 230 flows into the bucket at a given rate. The water dripping out of faucet 220 at the bottom of bucket 210 flows out of bucket 210 at a given rate.

When the rate of water flowing out of the bucket 210 equals the rate of water flowing into bucket 210, water line 244 remains at the same level. When the rate of water flowing out exceeds the rate of water flowing in, the level of water line 244 decreases. If the rate of water flowing out remains greater than the rate of water flowing in, then eventually bucket 210 is emptied. When the bucket 210 is empty, the rate of water flowing out cannot exceed the rate of water flowing in.

When the rate water flowing out is less than the rate of water flowing in, the level of the water line increases. Eventually, water line 244 reaches the top of the bucket 210 and water 240 begins to over flow. At this point the reserve level of water line 244 can no longer increase, so the volume of the bucket represents the maximum of the water reserve.

Resource Usage Based on Leaky Bucket Model

According to an embodiment of the invention, non-real-time clients are allocated bandwidth in manner analogous to the leaky bucket model described above. Specifically, a non-real-time client is associated with a reserve that is analogous to bucket 210. The reserve may be expressed as a number, where the value of the number is analogous to the level of the current water line 244 in bucket. The reserve number has a minimum value (e.g. zero) that is analogous to an empty bucket, and a maximum value that is analogous to a full bucket.

Units of resource usage are analogous to the units of water shown in FIG. 2. When the resource in question is a data server, each unit of resource usage may, for example, represent the operation of reading a predefined amount of data from the data server.

Clients are assigned a rate of resource usage. The assigned rate of resource usage is analogous to the rate at which water enters bucket 210 from faucet 230. As such, the assigned rate of resource usage represents the maximum rate at which a client may access data from a data server without lowering the waterline of the reserve. The rate at which the non-real-time client actually uses the resource is analogous to the rate at which water leaves bucket 210 through faucet 220. A rate of resource usage (both the assigned rate and the actual rate) can be expressed as a unit of data for a given unit of time, for example, five blocks per second.

During successive intervals of time, the rate at which a non-real-time client desires to use a resource may vary. For example, a non-real-time client may desire to read 10 megabytes from a data server during one second, and desire to read nothing in the subsequent second. The amount of resource usage a non-real-time client desires to perform during any given interval is referred to herein as the "desired" usage. The desired usage is analogous to the setting of faucet 220. If the desired usage is high, faucet 220 will be opened to let more water leak from the bucket 210. The desired usage will correspond to actual usage as long as there is water left in the bucket 210. The desired usage per a unit of time represents the desired usage rate.

When the desired usage rate of a client exceeds its assigned rate, then an actual usage rate can exceed the desired amount to an extent no greater than the amount of data represented by the current value of the reserve. When the desired usage rate exceeds the assigned usage rate, the difference is used to decrement the reserve. The reserve is never reduced below zero.

When the desired usage rate causes the client to access data at a rate less than the assigned rate of client, then the actual usage rate is less than the assigned usage rate for a period of time. When the actual usage rate is less than the assigned usage rate, the reserve is incremented. The reserve never accumulates over a threshold amount of data represented by the reserve maximum.

Using the Reserve

Figure 3:
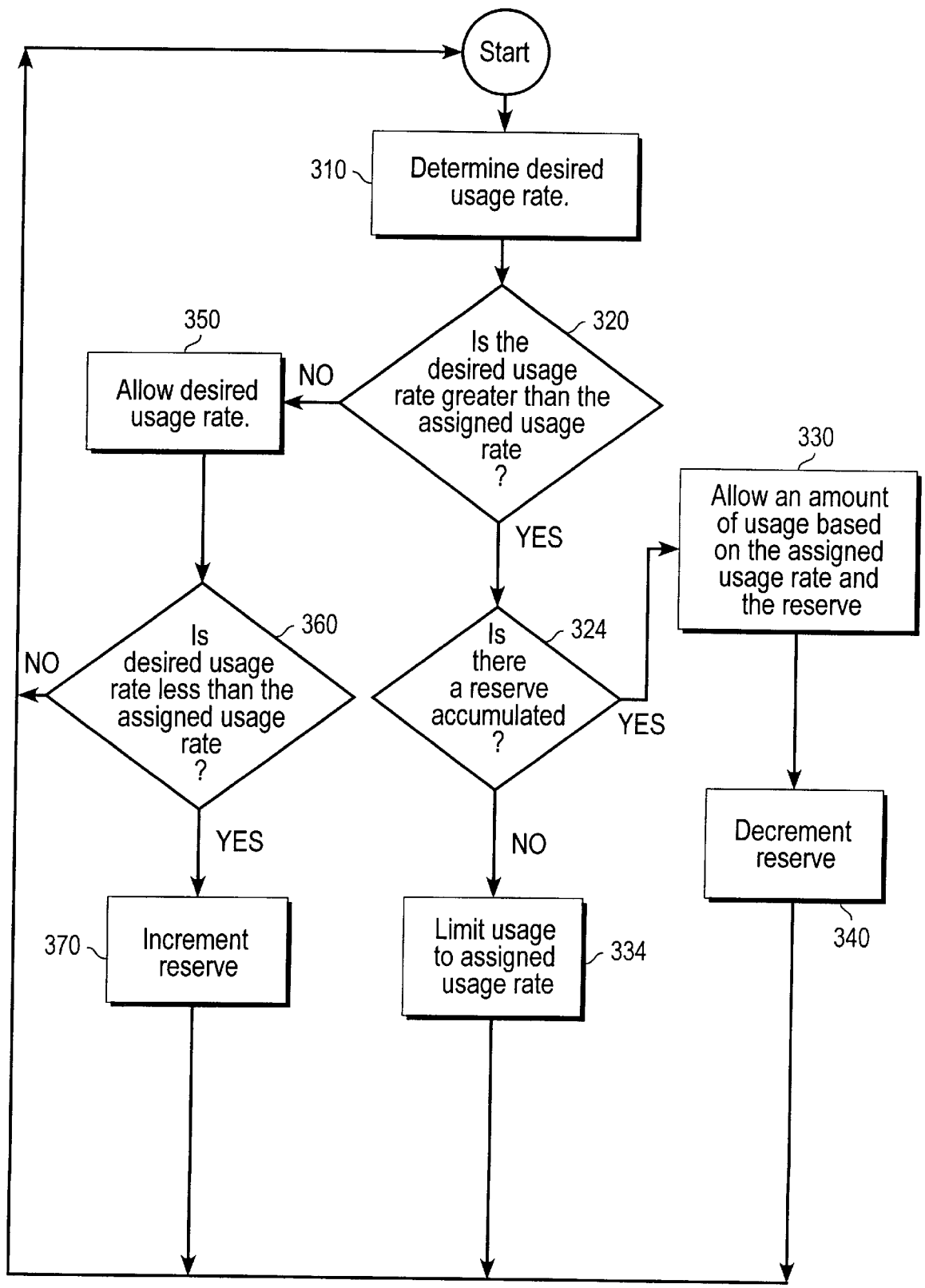
FIG. 3 is a flowchart showing the steps of using a reserve to meet the data requirements of a client according to an embodiment of the invention.

FIG. 3 depicts the steps for using the reserve according to an embodiment of the invention. The steps can be executed at successive time intervals in response to a client accessing a resource. The steps may be performed by clients that self govern their access to a shared resource, or by other executing entities responsible for governing access to computer resources.

In step 310, the desired usage rate is determined. Typically, non-real-time clients can use as much of a computer resource as can be made available to them. In these cases the desired usage rate is analogous to infinity. In other situations, non-real-time clients may limit the rate at which they use a computer resource so that more of the resource is available for use by other clients. For example, a non-real-time client that is utility that verifies file integrity in a disk system may run periodically in the background. The utility can run for an extended period of time before completing and still properly perform its function. Because completing in a short period of time is not critical to the function of the utility, the desired usage rate of the disk system can be set at rate relatively low compared to other clients on the system. Finally, the desired usage rate for a non-real-time client may vary over time in response to numerous conditions or events that typically occur in computer systems. For example, a report processor may lay idle until it receives a request to generate a report. In response to this request, the desired rate of usage by the report processor of disk system that contains files used to store the report would suddenly increase.

The desired usage rate can be expressed as a rate. Alternatively, the desired amount can be based on a specific amount of data needed for a given period of time. An embodiment of the invention encompasses requests in any form convertible to an amount of data. Once the desired usage rate is determined, control passes to step 320.

In step 320, a determination is made as to whether the desired usage rate exceeds an assigned usage rate. If the desired usage rate exceeds the assigned usage rate, control then passes to step 324.

In step 324, a determination is made of whether a reserve has been accumulated. A reserve has been accumulated if the reserve is greater than the equivalent of zero. If the determination made is that there is a reserve accumulated, then control passes to step 330.

In step 330, an amount of usage is allowed based on the assigned usage rate and the reserve. If the excess of the desired usage rate over the assigned usage rate corresponds to a usage less than or equal to the reserve, then the amount of usage allowed is the amount equivalent to the desired usage rate. Otherwise, the amount of usage allowed is limited by the assigned usage rate and the reserve. Control then passes to step 340.

In step 340, the reserve is decremented. The reserve is decremented by the amount of the reserve used to supplement the allowed usage in step 330. Note that the reserve is never decremented below zero because the amount of the reserve used to supplement the amount of usage allowed never exceeds the amount of data in the reserve. Execution of the steps ends until the steps are invoked again.

If the determination in step 324 is that there is no reserve accumulated, control then passes to step 334. In step 334, the amount of usage is limited to the amount equivalent to the assigned usage rate. Execution of the steps ends until the steps are invoked again.

If the determination in step 320 is that the desired usage rate is not greater than the assigned usage rate, control then passes to step 350. In step 350, the desired usage rate is allowed. Control then passes to step 360.

In step 360, a determination is made of whether the desired usage rate is less than the assigned usage rate. If the desired usage rate is not less than the assigned usage rate, then execution of the steps ceases until the steps are invoked once again. Otherwise, control passes to step 370.

In step 370, the reserve may be incremented. In one embodiment of the invention, the reserve can be incremented by an amount that is the equivalent of the difference between the assigned usage rate and the desired usage rate for the period of time between the time intervals at which the steps are executed. In an alternate embodiment of the invention, the reserve may be incremented by a predetermined fixed amount. The reserve is never incremented above the reserve maximum.

Reserve Meets Varying Data Requirements

Allocating resource usage based on the leaky bucket model provides flexibility to meet the varying data requirements typical of non-real-time clients. When a client accesses the server at a rate less than their assigned rate, the reserve for the client may increase. At a later time, when a client requires more data than can be provided at the assigned rate, the increased reserve may enable the client to access the server at a rate greater than the assigned rate.

The reserve maximum serves as a governor. Over a given period of time, the reserve maximum represents the excess over the assigned rate that can be provided to a client that poses a minimal risk of interfering with the service of data to other clients. For example, the reserve maximum can represent in aggregate the portion of the assigned rate typically not used by the clients. Making this amount available to a client needing more than their assigned rate should entail little risk of interference because this is the amount typically not used by the clients anyway.

Configuring the Reserve

In one embodiment of the invention, the maximum reserve is based on configuration data stored in a repository on computer system 100. The configuration data can be changed in response to changes in the patterns of the usage of the resource. One embodiment receives input representing configuration data and stores it in the repository.

A reserve can be shared by more than one client. Sharing a reserve in this manner enables the unused capacity of the server, as embodied by the reserve, to be shared by more than one non-real-time client.

Real time clients as well as non-real-time clients could be share their own reserve. For real-time clients, a reserve of zero could normally be assigned. When the reserve is zero, the assigned rate can never be exceeded. This situation would normally suit the needs of real-time clients because typically their data requirements do not exceed their assigned rate and their data requirements vary little. When a situation is encountered where allocating a reserve to real-time clients would be useful, the configuration data on which the reserve for the real-time clients is based could be changed.

In an alternate embodiment of the invention, the reserve may not be incremented in the manner depicted in FIG. 3 by step 370. Instead, another entity executing on computer system 100 may periodically increment the reserve.

Media Server Example

Figure 4:
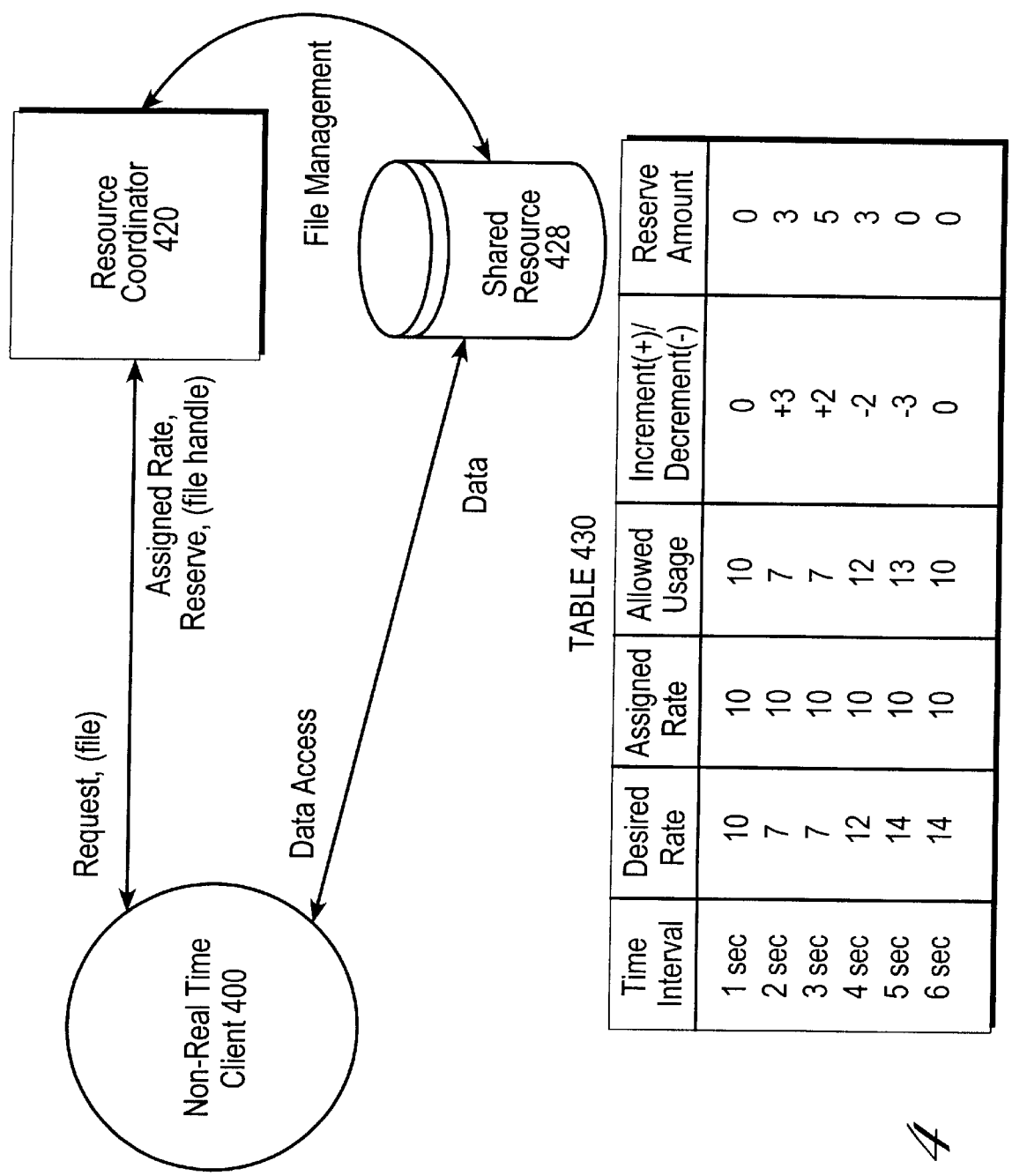
FIG. 4 is a block diagram that shows a non-real-time client, a resource coordinator, and a shared resource used in an illustration of the steps of an embodiment of the invention.

FIG. 4 shows non-real-time client 400, resource coordinator 420, and shared resource 428. Non-real-time client 400, resource coordinator 420, and shared resource 428 will be used to illustrate the steps of an embodiment of the invention. To facilitate the illustration of the operation of the steps, the steps are applied to only one non-real-time client. Non-real-time client 400 accesses shared resource 428 every second for a period of time to read data from shared resource 428. The bandwidth on shared resource 428 is one hundred blocks of data a second.

Non-real-time client 400 transmits a request to resource coordinator 420 for access to shared resource 428 at a rate of 20 blocks/sec. Based on current usage of shared resource 428 by other clients, resource coordinator 420 has assigned a rate of 10 blocks/sec to non-real-time client 400, and a reserve of 5 blocks. Resource coordinator 420 transmits a message to non-real-time client 400 indicating that the assigned rate is 10 blocks/sec and that the reserve is 5 blocks. Because non-real-time client 400 governs its own access to shared resource 428, non-real-time client 400 performs all the steps in FIG. 3.

In an alternate embodiment of the invention, non-real-time client can transmit a message simply requesting access to a file in shared resource 428, which can be a disk system. Resource coordinator 420 can then transmit an assigned rate and file handle to non-real-time client 400.

Table 430 shows various states after each access by non-real-time client 400 of shared resource 428. The columns from left to right are the time interval, the desired usage rate, the assigned usage rate, the allowed usage, the increment or decrement of the reserve, and the reserve after execution of the steps in each time interval. The columns representing amounts of data contain numbers expressing a rate in blocks/sec. In the increment or decrement column, increments are represented by positive integers, and decrements are represented by negative integers.

At the one second interval, in step 310, non-real-time client 400 determines that it could use 10 blocks of data over the next second, so the desired usage rate is 10 blocks/sec. In step 320, the determination made is that the desired usage rate is not greater than the assigned usage rate. In this illustration, the assigned usage rate remains constant. After step 320, control passes to step 320.

In step 350, the usage rate allowed is the desired usage rate, which is 10 blocks/sec. Therefore, non-real-time client 400 accesses shared resource 428 at a rate of 10 blocks/sec. At step 360, a determination is made of whether the desired usage rate is less than the assigned usage rate. Because the desired usage rate is equal to the assigned usage rate of data, the reserve is not incremented and execution of the steps ceases.

At the two second interval, in step 310, non-real-time client 400 determines that it could use 7 blocks of data over the next second, so the desired usage rate is 7 blocks/sec. In step 320, the determination made is that the desired usage rate of 7 blocks/sec is not greater than the assigned usage rate of 10 blocks/sec. Therefore, control passes to step 350.

In step 350, the desired usage rate is allowed. At step 360, the determination made is that the desired usage rate of 7 blocks/sec is less than the assigned usage rate of 10 blocks. Therefore, control passes to step 370.

In step 370, the reserve is incremented. The amount of data that is the equivalent of the difference between the desired usage rate and the assigned usage rate for the period of time between the intervals of time of 1 second is 3 blocks/sec. The current amount in the reserve is zero, so adding 3 blocks will not exceed the reserve maximum of 5 blocks. The reserve is then incremented by 3 blocks. Performance of the step ceases.

At the three second interval, in step 310, non-real-time client 400 determines that it could use 7 blocks of data over the next second, so the desired usage rate is 7 blocks/sec. In step 320, the determination made is that the desired usage rate of 7 blocks/sec is not greater than the assigned usage rate of 10 blocks/sec. Therefore, control passes to step 350.

In step 350, the desired usage rate is allowed. At step 360, the determination made is that the desired usage rate of 7 blocks/sec is less than the assigned usage rate of ten. Therefore, control passes to step 370.

In step 370, the reserve is incremented. The difference between the desired usage rate and the assigned usage rate is 3 blocks/sec. The current amount in the reserve is 3 blocks, so adding 3 blocks would exceed the reserve maximum of 5 blocks. Therefore, the reserve is only incremented by 2 blocks, which is the maximum increment to the reserve that will not cause the reserve maximum to be exceeded. Performance of the step ends.

At the four second interval, in step 310, non-real-time client 400 determines that it could use 12 blocks of data over the next second, so the desired usage rate is 12 blocks/sec. In step 320, the determination made is that the desired amount of 12 blocks/sec is greater than the assigned usage rate of 10 blocks. Therefore, control passes to step 324. In step 324, the determination made is that there is a reserve accumulated. Therefore, control passes to step 330.

In step 330, an amount of usage is allowed based on the assigned usage rate and the reserve. The difference between the desired usage rate and the assigned usage rate is 2 blocks/sec. The reserve contains 5 blocks of data. Based on the period of time between the time intervals, which is 1 second, the difference is the equivalent of 2 blocks. Because the difference of 2 blocks is less than the reserve of 5 blocks, the allowed usage rate is the desired rate of 12 blocks/sec. Control then passes to step 340.

At step 340, the reserve is decremented by the amount of reserve used to supplement the amount of usage allowed in step 330. Decrementing the reserve by 2 leaves 3 blocks in the reserve. Performance of the steps cease.

At the five second interval, in step 310, non-real-time client 400 determines that it could use 14 blocks of data over the next second, so the desired usage rate is 14 blocks/sec. In step 320, the determination made is that the desired amount of 14 blocks/sec is greater than the assigned usage rate of 10 blocks. Therefore, control passes to step 324. In step 324, the determination made is that there is a reserve accumulated. Therefore, control passes to step 330.

In step 330, an amount of usage is allowed based on the assigned usage rate and the reserve. The difference between the desired usage rate and the assigned usage rate is 4 blocks/sec. Based on the period of time between the time intervals, which is 1 second, the difference is the equivalent of 4 blocks. The reserve contains 3 blocks of data. Because the difference of 4 blocks is greater than the reserve at 3 blocks, only the amount in the reserve is used to provide the amount of usage allowed. The usage allowed is 13 blocks, which is less than that which would be provided at the desired usage rate of 14 blocks/sec. Control then passes to step 340.

At step 340, the reserve is decremented by the amount of reserve used to supplement the amount of usage allowed in step 330. Decrementing the reserve by 3 leaves 0 blocks in the reserve. Performance of the steps cease.

At the six second interval, in step 310, non-real-time client 400 determines that it could use 14 blocks of data over the next second, so the desired usage rate is 14 blocks/sec. In step 320, the determination made is that the desired amount of 14 blocks/sec is greater than the assigned usage rate of 10 blocks. Therefore, control passes to step 324.

In step 324, the determination made is that there is no reserve accumulated. Therefore, control passes to step 334. In step 334, the amount of usage allowed is limited to the amount equivalent to the assigned rate, which is 10 blocks.

An embodiment of the invention applies to any resource with a limited capacity that is shared concurrently by users of the resource. One of many examples is a network card in a distributed environment. An embodiment of an invention can be used to allocate the resource among users that are both inputting and outputting to the card.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method for accessing a shared resource, comprising the steps of:

receiving from a resource coordinator an assigned usage rate for accessing said shared resource;

determining a desired usage rate, said desired usage rate being at a rate at which access to said shared resource is desired;

comparing said desired usage rate to said assigned usage rate;

in response to a determination that said desired usage rate is higher than said assigned usage rate, determining whether a usage reserve has been accumulated;

wherein said usage reserve reflects the degree to which clients have accessed said shared resource below rates assigned to said clients for accessing said shared resource; and if said usage reserve has been accumulated, then accessing said shared resource at an enhanced usage rate higher than said assigned usage rate.

2. The method of claim 1, wherein the step of accessing said shared resource at said enhanced usage rate higher than said assigned usage rate includes decrementing said usage reserve based on a difference between said enhanced usage rate and said assigned usage rate.

3. The method of claim 1, further including the step of in response to a determination that said usage reserve has not been accumulated, accessing said shared resource at said assigned usage rate.

4. The method of claim 1, further including the step of in response to a determination that said desired usage rate is not higher than said assigned usage rate, accessing said shared resource at said desired usage rate.

5. The method of claim 1, further including the step of if said desired usage rate is less than said assigned usage rate, then incrementing said usage reserve.

6. The method of claim 5, wherein the step of incrementing said usage reserve further includes the step of ceasing to increment said usage reserve when said usage reserve reaches a threshold maximum.

7. The method of claim 6, further including the steps of:

receiving configuration data defining said threshold maximum; and storing said configuration data defining threshold maximum.

8. A computer readable medium having stored thereon a plurality of sequences of instructions, the plurality of sequences of instructions including sequences which, when executed by a processor, cause said processor to perform the steps of:

receiving from a resource coordinator an assigned usage rate for accessing said shared resource;

determining a desired usage rate, said desired usage rate being at a rate at which access to said shared resource is desired;

comparing said desired usage rate to said assigned usage rate;

in response to a determination that said desired usage rate is higher than said assigned usage rate, determining whether a usage reserve has been accumulated;

wherein said usage reserve reflects the degree to which clients have accessed said shared resource below rates assigned to said clients for accessing said shared resource; and if said usage reserve has been accumulated, then accessing said shared resource at an enhanced usage rate higher than said assigned usage rate.

9. The computer readable medium of claim 8, wherein the step of accessing said shared resource at said enhanced usage rate higher than said assigned usage rate includes decrementing said usage reserve based on a difference between said enhanced usage rate and said assigned usage rate.

10. The computer readable medium of claim 8, further comprising sequences of instructions for performing the step of in response to a determination that said usage reserve has not been accumulated, accessing said shared resource at said assigned usage rate.

11. The computer readable medium of claim 8, further comprising sequences of instructions for performing the step of in response to a determination that said desired usage rate is not higher than said assigned usage rate, accessing said shared resource at said desired usage rate.

12. The computer readable medium of claim 11, further comprising sequences of instructions for performing the step of:

if said desired usage rate is less than said assigned usage rate, then incrementing said usage reserve.

13. The computer readable medium of claim 12, wherein the step of incrementing said usage reserve further includes the step of ceasing to increment said usage reserve when said usage reserve reaches a threshold maximum.

14. The computer readable medium of claim 13, further comprising sequences of instructions for performing the steps of:

receiving configuration data defining said threshold maximum; and storing said configuration data defining threshold maximum.

15. A computer implemented method for managing access to a shared resource, comprising the steps of:

receiving a request to access said shared resource at a desired usage rate, said desired usage rate being a rate at which access to said shared resource is desired, wherein said desired usage rate is higher than an assigned usage rate for accessing said shared resource;

determining whether one or more criteria are satisfied for permitting a shared resource to be accessed at a rate that is greater than said assigned rate, wherein said one or more criteria include whether said usage reserve has been accumulated;

wherein said usage reserve reflects the degree to which clients have accessed said shared resource below rates assigned to said clients for accessing said shared resource; and if said one or more criteria are satisfied for permitting a shared resource to access at a rate that is greater than said assigned rate, then permitting said resource to be accessed at an enhanced rate that is greater than said assigned rate.

16. The method of claim 15, wherein the step of determining whether said shared resource may be accessed includes the step of determining whether said usage reserve is at least as great as a threshold.

17. The method of claim 15, wherein the step of determining whether said shared resource may be accessed includes the step of determining whether said usage reserve has been accumulated.

18. The method of claim 15, further including the steps of incrementing said usage reserve when receiving a request to access said shared resource at a rate less than said assigned usage rate.

19. A computer-readable medium carrying one or more sequences of one or more instructions for managing access to a shared resource, the one or more sequences of one or more instructions including instructions which, when executed by one or more processors, cause the one or more processors to perform the steps of:

receiving a request to access said shared resource at a desired usage rate, said desired usage rate being a rate at which access to said shared resource is desired, wherein said desired usage rate is higher than an assigned usage rate for accessing said shared resource;

determining whether one or more criteria are satisfied for permitting a shared resource to be accessed at a rate that is greater than said assigned rate, wherein said one or more criteria include whether said usage reserve has been accumulated;

wherein said usage reserve reflects the degree to which clients have accessed said shared resource below rates assigned to said clients for accessing said shared resource; and if said one or more criteria are satisfied for permitting a shared resource to access at a rate that is greater than said assigned rate, then permitting said resource to be accessed at an enhanced rate that is greater than said assigned rate.

20. The computer-readable medium of claim 19, wherein the step of determining whether said shared resource may be accessed includes the step of determining whether said usage reserve is at least as great as a threshold.

21. The computer-readable medium of claim 19, wherein the step of determining whether said shared resource may be accessed includes the step of determining whether said usage reserve has been accumulated.

22. The computer-readable medium of claim 19, further including the steps of incrementing said usage reserve when receiving a request to access said shared resource at a rate less than said assigned usage rate.

* * * * *